R. C. HAMIL.
Riding Saddles.

No. 139,668.

Patented June 10, 1873.

UNITED STATES PATENT OFFICE.

ROBERT C. HAMIL, OF HARRISVILLE, TEXAS.

IMPROVEMENT IN RIDING-SADDLES.

Specification forming part of Letters Patent No. 139,668, dated June 10, 1873; application filed October 8, 1872.

*To all whom it may concern:*

Be it known that I, ROBERT C. HAMIL, of Harrisville, Bell county, Texas, have invented a new and useful Improvement in Men's Riding-Saddles; and I hereby declare that the following is an exact description thereof.

My invention consists of an improved form of saddle-tree, constructed in such a manner as to facilitate the mounting of the horse, and to furnish additional safeguards against being thrown, or against injury from falling between the saddle and ground when the horse falls.

Figure 1:
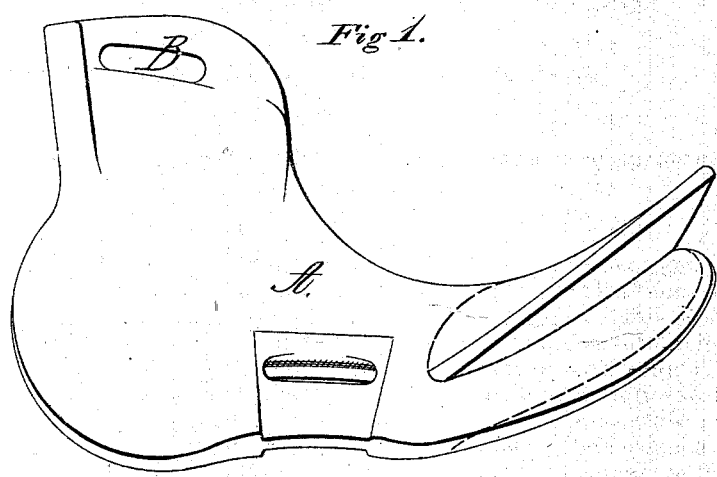
Figure 2:
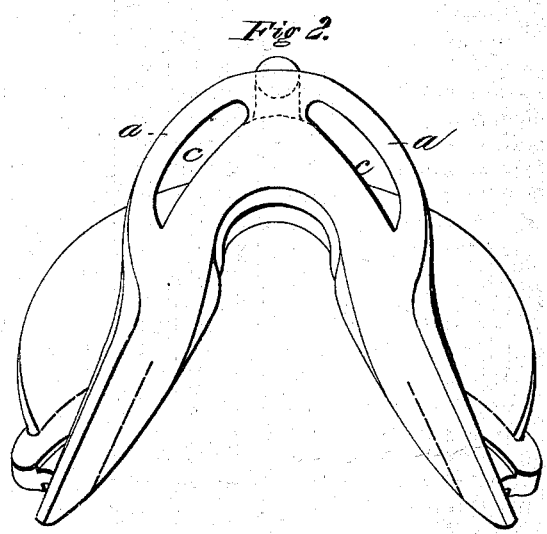

Figure 1 is a side elevation of the saddle-tree. Fig. 2 is a front elevation.

In the drawing, A represents the saddle-tree, of the same general form as other saddle-trees, but it has no pommel such as is usually placed on saddles of this description. The front tree is elevated above the level of the back, as seen in the drawing. From the rear of the front tree, extending forward on the top and center, is an arch, B, worked out of the solid wood, or made separately and afterward attached, which forms a longitudinal hand-hold, to be used by the horseman in mounting or dismounting. The forward part of the front tree is bowed outward, forming the projections *a a*, into which are cut the vertical openings C C, which form handles, to be used either as helps in mounting the horse or for any purpose for which they may be useful. By the device of these handles it is rendered much easier for the horseman to mount or dismount from the horse. The rider is also enabled to keep his seat more firmly and securely than in a plain saddle-tree; indeed it is next to impossible for one to be thrown. The pommel-saddle has many advantages of the same kind, but the use of it is attended with much risk, owing to the liability of being caught under it when the horse falls; but this risk or danger is obviated in the tree herein described, so that while I retain all the virtues of the pommel-saddle I get rid of its defects.

What I claim as new is—

A saddle-tree constructed with a longitudinal arched handle, B, in the center and on top of the front tree, and the vertically-arched handles C C in the front of the front tree, either worked out of the solid wood of the tree or made separately and afterward attached to the saddle-tree, as and for the purpose described.

R. C. HAMIL.

Witnesses:
R. J. TULLY,
J. M. SIMMONS.